(12) United States Patent
Kawahara et al.

(10) Patent No.: US 7,981,957 B2
(45) Date of Patent: Jul. 19, 2011

(54) BIODEGRADABLE GAS BARRIER CONTAINER AND PROCESS FOR PRODUCING THE SAME

(75) Inventors: Mitsuhiro Kawahara, Uji (JP); Miho Nakai, Uji (JP); Kazue Ueda, Uji (JP); Akinobu Ogami, Uji (JP); Shun Takahashi, Yokohama (JP); Takahiro Kusumoto, Yokohama (JP); Motoki Takata, Yokohama (JP)

(73) Assignees: Unitika Ltd., Hyogo (JP); Shiseido Company, Ltd., Tokyo (JP)

( * ) Notice: Subject to any disclaimer, the term of this patent is extended or adjusted under 35 U.S.C. 154(b) by 963 days.

(21) Appl. No.: 11/628,625

(22) PCT Filed: Jun. 8, 2005

(86) PCT No.: PCT/JP2005/010498
§ 371 (c)(1),
(2), (4) Date: Dec. 5, 2006

(87) PCT Pub. No.: WO2005/120978
PCT Pub. Date: Dec. 22, 2005

(65) Prior Publication Data
US 2008/0069993 A1     Mar. 20, 2008

(30) Foreign Application Priority Data
Jun. 10, 2004 (JP) .................. 2004-171947

(51) Int. Cl.
*C08K 3/34* (2006.01)

(52) U.S. Cl. ........ 524/444; 524/395; 524/445; 524/447; 524/449; 524/451

(58) Field of Classification Search ......... 524/395, 524/444, 445, 447, 449, 450, 451
See application file for complete search history.

(56) References Cited

U.S. PATENT DOCUMENTS
5,866,645 A * 2/1999 Pinnavaia et al. ........... 524/443
2003/0149156 A1* 8/2003 Okamoto et al. .......... 524/445
2005/0043462 A1 2/2005 Yamada et al.

FOREIGN PATENT DOCUMENTS
| JP | 2002-241667 | | 8/2002 |
| JP | 2003-82212 | | 3/2003 |
| JP | 2003082212 A | * | 3/2003 |
| JP | 2003-113326 | | 4/2003 |

* cited by examiner

*Primary Examiner* — Peter D Mulcahy
(74) *Attorney, Agent, or Firm* — Fildes & Outland, P.C.

(57) ABSTRACT

A biodegradable gas barrier vessel comprising 100 parts of mass of a biodegradable polyester resin having a polylactic acid content of not less than 50% by mass and 0.1 to 10 parts by mass of a phyllosilicate. The degree of crystallization as measured by X-ray diffractometry is not less than 15%, and the coefficient of oxygen permeation as measured under conditions of 20° C. and relative humidity 90% is not more than 50 ml·mm/m²·day·MPa. Since the biodegradable polyester resin reinforced with the phyllosilicate has excellent heat resistance, the molded product can be heat treated at an elevated temperature. Such enhanced heat treatment conditions can further enhance the degree of crystallization of the polyester resin and thus can contribute to significantly improved gas barrier properties.

8 Claims, 1 Drawing Sheet

BIODEGRADABLE GAS BARRIER CONTAINER AND PROCESS FOR PRODUCING THE SAME

TECHNICAL FIELD

The present invention relates to a biodegradable gas container having a gas barrier property adequate for fluid storage containers, and a production method therefor.

BACKGROUND ART

In recent years, biodegradable resins typified by polylactic acid have come into focus from the viewpoint of environmental preservation. The polylactic acid is one of the most heat-resistant and highly transparent biodegradable resins, and is less expensive because of its mass producibility. Therefore, the polylactic acid is very useful. However, the polylactic acid has an insufficient gas barrier property for use as a material for fluid storage containers such as cosmetic containers and food storage containers, and is liable to be deformed during use at higher temperatures. Therefore, the polylactic acid has limitations in its applications.

One exemplary method for improving the gas barrier property of the biodegradable resin is to use a phyllosilicate in combination with the biodegradable resin. In Japanese Journal of Polymer Science and Technology Vol. 59, No. 12, 2002, pp. 760-766, it is reported that the oxygen permeability coefficient of the resin is reduced to 54 ml·mm/m$^2$·day·MPa by using 7.5 wt % of a swellable phyllosilicate organically treated with a specific ammonium ion based on 100 wt % of the resin. However, even if the phyllosilicate is added in an increased amount, the improvement in the gas barrier property is peaked out. No consideration is hitherto given to a method for further improvement of the gas barrier property. Therefore, it is impossible to impart the biodegradable resin with a gas barrier property sufficient for use as a material for the containers.

On the other hand, a crystalline polymer can be imparted with a gas barrier property by increasing the crystallinity thereof. However, the polylactic acid has a lower crystallization speed. Even if the temperature of a mold is set at a temperature of 90 to 120° C. which is optimum for crystallization, the polylactic acid is in a semi-molten state. When the mold temperature is set at around a room temperature, the polylactic acid is cooled to be solidified, but its crystallinity is extremely low (e.g., Plastics Vol. 53, No. 10, 2002, pp. 37-39). To cope with this, JP-A-9-25345 discloses a molded product of a polylactic acid resin having a crystallinity increased by drawing. However, the polylactic acid resin crystallized by the drawing has insufficient heat resistance.

JP-A-2003-253009 discloses a method for increasing the crystallinity by heat-treating a product molded from a polylactic acid resin containing talc before or during the molding. However, the heat resistant temperature (DTUL) of the crystallized resin containing talc is about 100° C., so that the resin cannot withstand the heat treatment for a long period. To impart the resin with the same level of heat resistance, talc should be added in an amount of not less than 20 wt %. This reduces the moldability, and increases the specific gravity. In JP-A-2003-128901, the crystallization speed is increased by cross-linking polylactic acid with a (meth)acrylate compound. However, the physical properties and appearance of the resulting product are not satisfactory.

JP-A-2001-164097 discloses a hollow container molded from a composition containing an aliphatic polyester and an organic clay, but no consideration is given to improvement of the gas barrier property by thermal crystallization.

WO03/008178A1 discloses a product produced by molding, drawing and thermally fixing a hydroxyalkanoate resin consisting essentially of polylactic acid. However, an ordinary polylactic acid is used, so that the crystallization speed is lower. Therefore, it is difficult to cause the crystallization to proceed in a high temperature mold.

DISCLOSURE OF THE INVENTION

Problems to be Solved by the Invention

As described above, none of the conventionally known techniques provides a biodegradable gas barrier container imparted with a satisfactory gas barrier property by adding the phyllosilicate.

It is an object of the present invention to provide a biodegradable gas barrier container which has a satisfactory gas barrier property and is highly transparent and excellent in moldability/formability and heat resistance, and a production method for the biodegradable gas barrier container.

Means for Solving the Problems

As a result of intensive studies conducted to solve the aforesaid problems, the inventors of the present invention found that a biodegradable polyester resin reinforced with a phyllosilicate has an excellent heat resistance, so that a product molded from the biodegradable polyester resin can be heat-treated at a higher temperature than in the prior art. Therefore, the crystallinity of the polyester resin can be increased by more effective heat treatment conditions, thereby significantly improving the gas barrier property.

That is, the present invention has the following aspects:
(1) A biodegradable gas barrier container comprises 100 parts by mass of a biodegradable polyester resin having a polylactic acid content of not less than 50% by mass, and 0.1 to 10 parts by mass of a phyllosilicate, and has a crystallinity of not lower than 15% as measured by X-ray diffractometry, and an oxygen permeability coefficient of not higher than 50 ml·mm/m$^2$·day·MPa as measured at 20° C. at a relative humidity of 90%.
(2) In the biodegradable gas barrier container according to the aspect (1), the phyllosilicate is a phyllosilicate comprising a primary ammonium ion, a secondary ammonium ion, a tertiary ammonium ion, a quaternary ammonium ion, a pyridinium ion, an imidazolium ion or a phosphonium ion ion-bonded between layers thereof.
(3) In the biodegradable gas barrier container according to the aspect (1), the phyllosilicate is a phyllosilicate to which a substituted silyl group having a substituted or unsubstituted alkyl group is bonded.
(4) The biodegradable gas barrier container according to any of the aspects (1) to (3) is a container for a fluid.
(5) A production method for the biodegradable gas barrier container according to any of the aspects (1) to (4) comprises performing a heat treatment at a temperature not lower than a glass transition temperature and not higher than a melting starting temperature as measured by a differential scanning calorimeter (DSC) during molding or after molding.

Effects of the Invention

According to the present invention, the biodegradable polyester resin reinforced by the phyllosilicate is excellent in heat resistance, so that a molded product can be heat-treated at a higher temperature than in the prior art. Thus, the crystallinity of the polyester resin is further increased by more effective heat treatment conditions, thereby significantly improving the gas barrier property. Therefore, the biodegradable gas barrier container can be provided which is excellent in both the gas barrier property and the heat resistance. According to the present invention, the biodegradable polyester resin has a polylactic acid content of not less than 50% by mass and, therefore, is highly transparent. Further, the phyllosilicate is added in a small amount on the order of 0.1 to 10 parts by mass based on 100 parts by mass of the biodegradable polyester resin, so that the resulting biodegradable polyester resin is excellent in moldability/formability. The inventive container is applicable to cosmetic containers, food containers, blister packages, press-through packages and other containers for fluids. In addition, the inventive container is biodegradable and, therefore, can be composted when being discarded. This makes it possible to reduce the amount of garbage and to recycle the resulting compost as a fertilizer

BEST MODE FOR CARRYING OUT THE INVENTION

Figure 1:
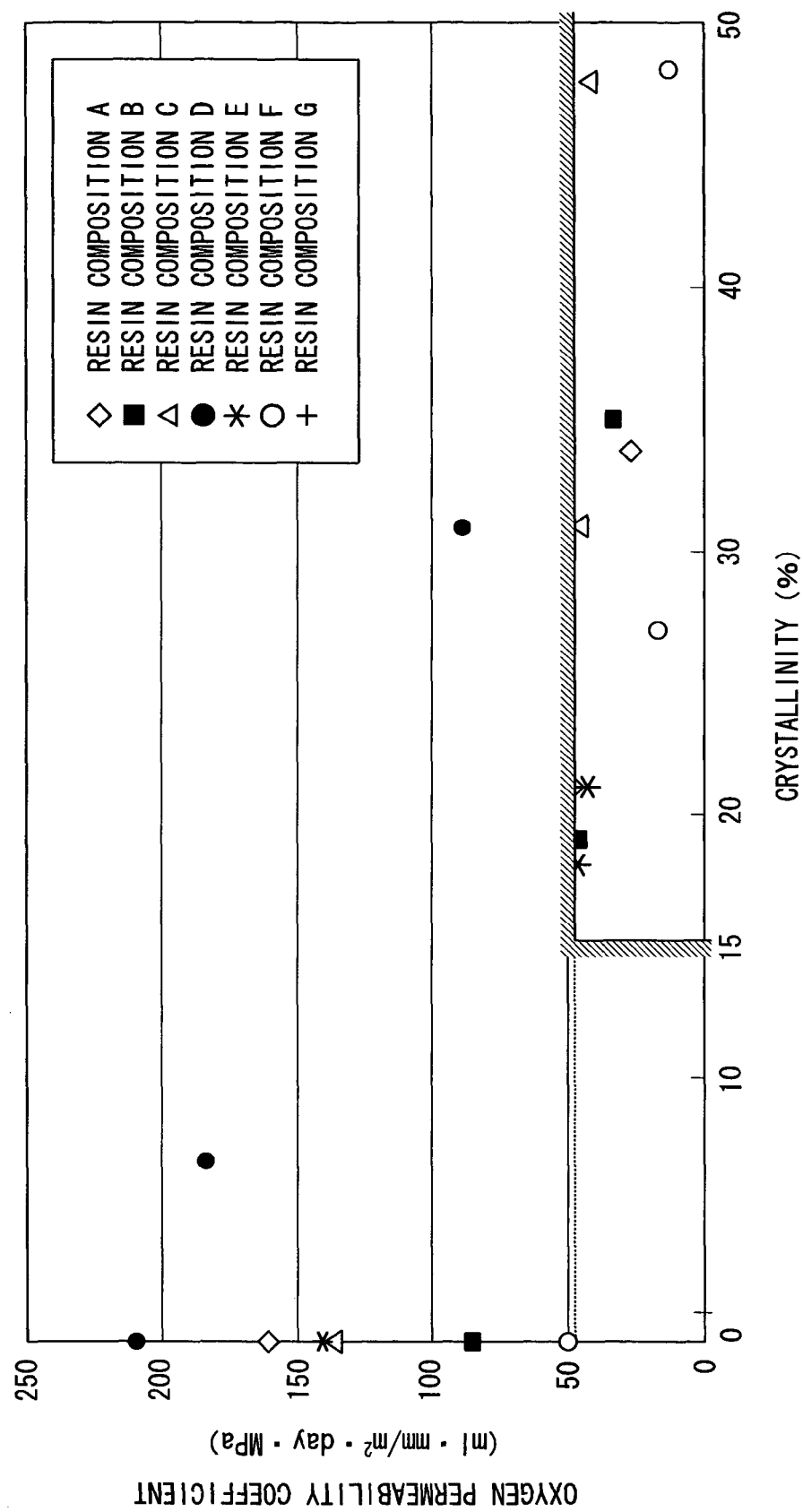
FIG. 1 is a diagram illustrating plots of crystallinity and oxygen permeability coefficient in examples of the present invention and comparative examples.

The present invention will hereinafter be described in detail.

A biodegradable polyester resin for an inventive biodegradable gas barrier container should have a polylactic acid content of not less than 50% by mass. The polylactic acid content is preferably not less than 60% by mass, more preferably not less than 80% by mass. If a biodegradable resin other than polylactic acid is contained in an amount of not less than 50% by mass, the resulting biodegradable resin composition is poorer in mechanical properties, transparency and heat resistance. Further, the reduction in the content of a plant-derived resin increases a load to the environment.

The polylactic acid as a major component of the biodegradable polyester resin to be used in the present invention may be poly(L-lactic acid), poly(D-lactic acid), or a mixture, a stereo-complex or a copolymer of these polylactic acids.

The biodegradable polyester resin to be used in the present invention is typically prepared by employing a known melt polymerization method, as required, in combination with a solid-phase polymerization method. Examples of the biodegradable resin other than the polylactic acid to be used for the inventive biodegradable polyester resin include: aliphatic polyesters typified by poly(ethylene succinate), poly(butylene succinate) and poly(butylene succinate-co-butylene adipate) which are each prepared from a diol and a dicarboxylic acid; polyhydroxycarboxylic acids such as polyglycolic acid, poly(3-hydroxybutyric acid), poly(3-hydroxyvaleric acid) and poly(3-hydroxycaproic acid); poly(ω-hydroxyalkanoates) typified by poly(ε-caprolactone) and poly(δ-valerolactone); poly(butylene succinate-co-butylene terephthalate) and poly(butylene adipate-co-butylene terephthalate) which are biodegradable even with aromatic components; polyester amides; polyester carbonates; and polysaccharides such as starch. These compounds may be used alone, or two or more of these compounds may be used in combination or copolymerized with each other. Further, any of these components may be simply mixed with the polylactic acid as the major component, or may be copolymerized with the polylactic acid. Non-biodegradable resins such as a polyamide (nylon), polyethylene, polypropylene, polybutadiene, polystyrene, an AS resin, an ABS resin, poly(acrylic acid), poly(acrylate), poly(methacrylic acid), poly(methacrylate), poly(ethylene terephthalate), poly(ethylene naphthalate), polycarbonate or polyarylate or a copolymer of any of these polymers may be added to the biodegradable resin other than the polylactic acid, as long as the properties of the resin composition is not deteriorated.

In the present invention, the phyllosilicate contributes not only to the gas barrier property as in the prior art, but also to the improvement of the heat resistance of the biodegradable polyester resin as described above. In addition, a molded product imparted with the heat resistance can be heat-treated at a higher temperature than in the prior art. Therefore, the crystallinity of the polyester resin can be increased by more effective heat treatment conditions, thereby significantly improving the gas barrier property.

The phyllosilicate is a swellable lamellar clay mineral, and specific examples thereof include smectites, vermiculites and swellable fluorinated mica. Examples of the smectites include montmorillonite, beidellite, hectorite and saponite. Examples of the swellable fluorinated mica include Na-type silicon tetrafluoride mica, Na-type taeniolite and Li-type taeniolite. Other examples of the phyllosilicate include phyllosilicates such as kanemite, makatite, magadiite and kenyaite which are free from aluminum and magnesium. Besides the naturally occurring phyllosilicates, synthetic phyllosilicates may be used. Exemplary synthesizing methods include a melting method, an intercalation method and a hydrothermal method, and any of these methods may be used. These phyllosilicates may be used alone or as a combination of two or more types of phyllosilicates different in kind as mineral substance, production region and particle diameter.

In order for improvement of the affinity between the phyllosilicate and the biodegradable polyester resin and the dispersibility of the phyllosilicate so as to further improve the gas barrier property, any of primary ammonium ions, secondary ammonium ions, tertiary ammonium ions, quaternary ammonium ions, pyridinium ions, imidazolium ions and phosphonium ions are preferably ion bonded between layers of the phyllosilicate. The primary, secondary and tertiary ammonium ions are obtained by protonizing corresponding primary, secondary and tertiary amines. Examples of the primary amines include octylamine, dodecylamine and octadecylamine. Examples of the secondary amines include dioctylamine, methyloctadecylamine and dioctadecylamine. Examples of the tertiary amines include trioctylamine, dimethyldodecylamine and didodecylmonomethylamine. Examples of the quaternary ammonium ions include tetraethylammonium, octadecyltrimethylammonium, dimethyldioctadecylammonium, hydroxyethyldimethyloctadecylammonium, hydroxyethyldimethyldodecylammonium, benzyldihydroxyethyldodecylammonium, benzyldihydroxyethyloctadecylammonium, N,N-bis(2-hydroxyethyl)-N-(3'-dodecyloxy-2'-hydroxypropyl)methylammonium, dihydroxyethylmethyldodecylammonium, methyldodecylbis(polyethylene glycol)ammonium and methyldiethyl(polypropylene glycol)ammonium. Examples of the phosphonium ions include tetraethylphosphonium, tetrabutylphosphonium, hexadecyltributylphosphonium, tetrakis(hydroxymethyl)phosphonium and 2-hydroxyethyltriphenylphosphonium. Phyllosilicates treated with an ammonium ion or a phosphonium ion such as dihydroxyethylmethyloctadecylammonium, hydroxyethyldimethyloctadecylammonium, hydroxyethyldimethyldodecylammonium, dihydroxyethylmethyldodecylammonium, methyldodecylbis(polyethylene glycol)ammonium, methyldiethyl(polypropylene glycol)ammonium or 2-hydroxyethyltriphenylphosphonium which contains one or more hydroxyl groups in its molecule are preferred, because such phyllosilicates each have a high affinity for the biodegradable polyester resin and an improved dispersibility in the biodegradable polyester resin. These ionic compounds may be used either alone or in combination.

A method for treating the phyllosilicate with any of the primary, secondary, tertiary and quaternary ammonium ions and the phosphonium ions is not particularly limited. For example, the phyllosilicate is dispersed in water or an alcohol, and any of the primary, secondary and tertiary amines and an acid (hydrochloric acid or the like) or a salt of any of the quaternary ammoniums and the phosphoniums is added to the resulting dispersion and mixed with stirring, whereby inorganic ions present between layers of the phyllosilicate are exchanged with the ammonium ions or the phosphonium ions. Then, the resulting phyllosilicate is filtered, washed and dried.

The phyllosilicate to be used in the present invention preferably contains a substituted silyl group having a substituted or unsubstituted alkyl group bonded or coordination-bonded between layers thereof for improvement of the dispersibility thereof in the resin. Such a phyllosilicate is prepared by silylation with a silane compound having the substituted or unsubstituted alkyl group. The substituted silyl group is an organic group obtained by substituting a specific substituent containing the substituted or unsubstituted alkyl group for a hydrogen atom of a silyl group ($-SiH_3$). Examples of the substituent include a hydroxyl group, a chlorine atom, a methyl group, an ethyl group, a methoxyl group, an ethoxyl group, an amino group, an epoxyethyl group, an epoxyethyloxy group, a vinyl group, an isopropenyl group, 1-phenylvinyl group, 4-vinylphenyl group, an isocyanate group and a carbodiimide group. The unsubstituted alkyl group preferably has 3 to 20 carbon atoms, more preferably 8 to 18 carbon atoms in a straight chain portion thereof. If the number of the carbons of the unsubstituted alkyl group is less than 3, the length of the alkyl group contained in the substituted silyl group is too small, so that the inter-layer distance of the phyllosilicate is not sufficiently increased. This makes it difficult for the resin to intrude into interlayer spaces, thereby reducing the dispersibility of the phyllosilicate in the resin. As a result, the gas barrier property of the molded product is reduced. On the other hand, if the number of the carbon atoms of the unsubstituted alkyl group is greater than 20, a greater proportion of the interlayer spaces of the phyllosilicate is occupied by the substituted silyl group, thereby reducing the dispersibility of the phyllosilicate to deteriorate the gas barrier property of the molded product. The alkyl group may have an atom group such as an amide bond, an ester bond, an N-oxymethyleneamino group ($-OCH_2NH-$) or an N,N'-di(oxymethylene)amino group ($-(OCH_2)_2NH-$) in its chain. Examples of the phyllosilicate suitable for the silylation include kanemite, makatite, magadiite and kenyaite. Among these, the most preferable phyllosilicate is magadiite.

The amount of the phyllosilicate to be added should be 0.1 to 10 parts by mass, preferably 0.2 to 6 parts by mass, more preferably 0.5 to 5 parts by mass, based on 100 parts by mass of the biodegradable polyester resin. If the amount is less than 0.1 part by mass, it is impossible to provide a heat resistance improving effect and a gas barrier property improving effect accompanying the former effect as intended by the present invention. On the other hand, if the amount is greater than 10 parts by mass, the moldability/formability and the transparency intended by the present invention are reduced and the hydrolysis resistance is also deteriorated.

In the present invention, the dispersibility of the swellable phyllosilicate in the resin is controlled by changing kneading conditions in a kneading method, by adding a third component serving as a compatibilizer having affinity for both the resin and the phyllosilicate, or by introducing a polar group to the resin per se. Further, the dispersibility may be increased by employing an ordinary polymerization method.

A matrix resin for the inventive biodegradable gas barrier container has a crystallinity of not lower than 15% as measured by X-ray diffractometry for improving the gas barrier property. The crystallinity is preferably not lower than 30%, more preferably not lower than 50%.

The inventive biodegradable gas barrier container should have an oxygen permeability coefficient of not greater than 50 ml·mm/m$^2$·day·MPa as measured at 20° C. at 90% RH when the biodegradable gas barrier container is used as a storage container. The oxygen permeability coefficient is preferably not greater than 40 ml·mm/m$^2$·day·MPa, more preferably not greater than 30 ml·mm/m$^2$·day·MPa.

The crystallinity is herein defined as the crystallinity of the matrix resin determined through measurement by a WAXD reflection method by means of an X-ray diffractometer and calculation of an integral intensity ratio by a multi-peak resolution method.

An exemplary preparation method for the polyester resin composition for the inventive biodegradable gas barrier container is to melt-knead the biodegradable polyester resin and the phyllosilicate by an ordinary kneader such as a single screw extruder, a twin screw extruder, a roll kneader or a Brabender. In order to facilitate the dispersing of the phyllosilicate, the twin screw extruder is preferably used. A second preparation method for the polyester resin composition for the inventive biodegradable gas barrier container is to add a predetermined amount of the phyllosilicate to monomers of the biodegradable polyester and, in this state, polymerize the monomers.

Another preferred preparation method for the polyester resin composition for the inventive biodegradable gas barrier container is to mix a phyllosilicate having an average particle diameter of not greater than 4 μm with the resin. The average particle diameter of the phyllosilicate is preferably not greater than 3 μm, more preferably not greater than 2 μm. The average particle diameter of the phyllosilicate can be properly controlled by known pulverization and classification methods.

A pigment, a heat stabilizer, an antioxidant, a weather resistant agent, a flame retarder, a terminal blocking agent, a plasticizer, a lubricant, a mold release agent, an antistatic agent, a fluorescent brightening agent, a filler or the like may be added to the polyester resin composition for the inventive biodegradable gas barrier container, as long as the object of the present invention is not significantly hindered. Examples of the heat stabilizer and the antioxidant include hindered phenols, phosphorus compounds, hindered amines, sulfur compounds, copper compounds and halides of alkali metals, and mixtures of any of these compounds. The phosphorus compounds are most preferable, and are preferably added in an amount of 0.01 to 5 parts by mass based on 100 parts by mass of the biodegradable polyester resin. Examples of the terminal blocking agent include compounds having a carbodiimide group, an isocyanate group and an epoxy group. These compounds may be used either alone or in combination. In terms of costs and performance, the amount of the terminal blocking agent to be added is preferably 0.01 to 5 parts by mass based on 100 parts by mass of the biodegradable polyester resin. Examples of the lubricant include anionic surface active agents, nonionic surface active agents, cationic surface active agents and olefin waxes. In order to improve the dispersibility of the phyllosilicate, the gas barrier property and the appearance, the lubricant is preferably added in an amount of 0.01 to 5 parts by mass based on 100 parts by mass of the biodegradable polyester resin. Examples of the filler include inorganic fillers and organic fillers. Examples of the inorganic fillers include talc, calcium carbonate, zinc carbonate, warrastonite, silica, alumina, magnesium oxide, calcium silicate, sodium aluminate, calcium aluminate, sodium aluminosilicate, magnesium silicate, glass balloon, carbon black, zinc oxide, antimony trioxide, zeolites, hydrotalcite, metal fibers, metal whiskers, ceramic whiskers, potassium titanate, boron nitride, graphite, glass fibers and carbon fibers. Exemplary organic fillers include naturally existing polymers such as kenaf, starch, cellulose particles, wood powder, bean curd refuse, chaff and wheat bran, and products obtained by modifying any of these polymers.

A method for mixing any of the heat stabilizer, the antioxidant, the plasticizer, the light resistant agent, the flame retarder, the terminal blocking agent, the lubricant, the mold release agent, the antistatic agent, the fluorescent brightening agent, the filler and the like with the polyester resin composition for the inventive biodegradable gas barrier container is not particularly limited. Any of these additives may be added during the preparation of the biodegradable polyester resin or during the melt-kneading of the biodegradable polyester resin and the phyllosilicate.

A method for molding the inventive biodegradable gas barrier container is not particularly limited, but any of known molding methods such as an injection molding method and a blow molding method may be employed for production of various molded products. Optimum conditions for the molding of the inventive biodegradable gas barrier container of the polyester resin will be described below.

An ordinary injection molding method as well as a gas injection molding method and an injection press molding method may be employed as the injection molding method. A cylinder temperature for the injection molding should be not lower than the melting starting temperature (Tm) or the fluidization starting temperature of the biodegradable polyester resin, preferably 140 to 230° C., more preferably 160 to 220° C. If the molding temperature is too low, short shot molding will occur to result in unstable molding, and overload is liable to occur. On the other hand, if the molding temperature is too high, the biodegradable polyester resin will be decomposed and, therefore, the resulting molded product will have a reduced strength or be colored. The temperature of a mold should be not higher than Tm−20° C., wherein Tm is the melting starting temperature of the biodegradable polyester resin. Where the crystallization of the biodegradable polyester resin is to be promoted in the mold for increasing the heat resistance and the gas barrier property of the biodegradable polyester resin, the mold temperature is preferably kept at a temperature not lower than Tg+20° C. and not higher than Tm−20° C. for a predetermined period (wherein Tg is the glass transition temperature of the resin) and then reduced to not higher than Tg. On the other hand, where post-crystallization is carried out, heat treatment is preferably performed at a temperature not lower than Tg and not higher than Tm−20° C. after the mold temperature is once reduced to not higher than Tg.

Exemplary blow molding methods include a direct blowing method in which the container is molded directly from material chips, an injection blow molding method in which a preform (bottomed parison) prepared by injection molding is blow-molded, and a draw blow molding method. Further, a hot parison method in which a preform is blow-molded immediately after preparation of the preform, or a cold parison method in which a preform is once cooled and taken out and then reheated to be blow-molded may be employed. A mold temperature for the blow molding is preferably not lower than Tg+20° C. and not higher than Tm−20° C. If the mold temperature for the blow molding is lower than Tg+20° C., the crystallization will be difficult and, therefore, the resulting container will have an insufficient gas barrier property. If the mold temperature for the blow molding is higher than Tm−20° C., the resulting container is liable to have an uneven wall thickness, and draw-down will occur due to reduction of viscosity.

In the present invention, the molded product for the container is preferably heat-treated at a temperature not lower than Tg and not higher than Tm as measured by a differential scanning calorimeter (DSC) for increasing the crystallinity of the resin and hence improving the gas barrier property of the container. The heat treatment may be performed during the molding or after the molding. Where the mold temperature for the injection molding and the blow molding is set at a relatively high temperature within the aforesaid range, the heat treatment is performed during the molding. Specifically, the temperature for the heat treatment is preferably around the crystallization temperature of the polylactic acid or the second biodegradable polyester resin. More specifically, the heat treatment temperature is preferably not lower than Tg and not higher than Tm−20° C., more preferably not lower than Tg+20° C. and not higher than Tm-30° C.

The inventive biodegradable gas barrier container is usable as a cosmetic container, a food container, an agricultural/horticultural container, a blister package, a press-through package or a fluid container.

The shapes of the food container, the agricultural/horticultural container, the blister package and the press-through package are not particularly limited, but these containers are preferably each have a relatively great depth on the order of not smaller than 2 mm for containing food, goods and drugs. Further, the wall thickness of any of these containers is not particularly limited, but is preferably not smaller than 50 μm, more preferably 150 μm to 2 mm, for strength. Specific examples of the food container include fresh food trays, instant food containers, fast food containers and lunch boxes. Specific examples of the agricultural/horticultural container include seeding pots. Specific examples of the blister package include food containers as well as packages for various commodities including stationery, toys and dry batteries. Examples of the press-through package include packages for drugs.

The shape of the fluid container is not particularly limited, but the fluid container preferably has a depth of not smaller than 20 mm for containing fluid. The wall thickness of the fluid container is not particularly limited, but is preferably not smaller than 0.2 mm, more preferably 0.5 to 5 mm, for strength. Specific examples of the fluid container include drinking cups and beverage bottles for milk beverages, cold beverages and alcoholic beverages, temporary storage containers for seasonings such as soy sauce, sauce, mayonnaise, ketchup and cooking oil, containers for shampoo and rinse, cosmetic containers, and agricultural containers.

EXAMPLES

The present invention will hereinafter be described more specifically by way of examples thereof. However, the present invention is not limited to the following examples. The following measurement methods were employed for evaluation of containers (molded or formed products) of the following examples and comparative examples.

(1) Crystallinity

The crystallinity of a molded or formed product was determined through measurement by a WAXD reflection method by means of an X-ray diffractometer (available from Rigaku Denki Kogyo K.K., and employing RAD-rB and Cu-Kα ray) and calculation of an integral intensity ratio by a multi-peak resolution method.

(2) Oxygen Permeability Coefficient

The oxygen permeability of a heat-pressed sheet (200-300 μm) preliminarily moisture-conditioned was measured at 20° C. at a relative humidity of 90% through a differential pressure method by means of a differential pressure gas permeability measuring device (Yanaco's GTR-30×AU). The oxygen permeability coefficient is calculated from the following expression:

(Oxygen permeability coefficient)=(Oxygen permeability)×(Thickness of sample)

Measuring periods were 0.5 h, 1 h and 2 h. A value thus determined was an index of the gas barrier property. The smaller the value is, the more excellent the gas barrier property is.

(3) Moldability/Formability and Heat Resistance

Molded products and formed products were visually evaluated during molding/forming and after heat treatment.

That is, a pressed sheet free from wrinkles and deformation was regarded as having an excellent formability (o), and a pressed sheet suffering from wrinkles and deformation was regarded as having a poor formability (x). A pressed sheet free from wrinkles and distortion after the heat treatment was regarded as having an excellent heat resistance (o), and a pressed sheet suffering from wrinkles and distortion after the heat treatment was regarded as having a poor heat resistance (x).

A bottle having an excellent appearance and continuously moldable was regarded as having an excellent moldability (o), and a bottle suffering from uneven wall thickness and deformation was regarded as having a poor moldability (x). Where bottles were molded in a cold mold and then heat-treated or molded in a hot mold, a bottle having an excellent appearance was regarded as having an excellent heat resistance (o) and a bottle suffering from uneven wall thickness and deformation was regarded as having a poor heat resistance (x).

Further, a product which could not be evaluated was indicated by a symbol (−).

(4) Water Vapor Permeability

The smaller the value of the water vapor permeability is, the more excellent the barrier property is. The molded bottle was filled with pure water and allowed to stand in a dryer at 50° C. for 30 days. A bottle having a content reduction ratio of lower than 2% was regarded as having an excellent barrier property (o), and a bottle having a content reduction ratio of not lower than 2% was regarded as having a poor barrier property (x).

(5) Evaluation

Pressed sheets each having an oxygen permeability coefficient of not higher than 50 ml·mm/m²·day·MPa and an excellent appearance after the heat treatment were regarded to be acceptable (o), and the other press sheets were regarded to be unacceptable (x).

Bottles each having a water vapor permeability of lower than 2% and, if heat-treated, keeping an excellent appearance after the heat treatment were regarded to be acceptable (o), and the other bottles were regarded to be unacceptable (x).

Ingredients

The following ingredients were used in the examples and the comparative examples.

(1) Polylactic Acid (Hereinafter Referred to as "PLA")

Nature Works available from Cargill Dow Corporation and having a weight average molecular weight (MW) of 190,000 and a melting point of 170° C.

(2) ESBEN E

Montmorillonite with its interlayer ions replaced with trimethyloctadecylammonium ions (ESBEN E available from Hojun Co., Ltd.)

(3) SOMASIF MEE

Synthetic swellable mica with its interlayer ions replaced with dihydroxyethylmethyldodecylammonium ions (available from Coop Chemical Co., Ltd. and having an average particle diameter of 6.2 μm)

(4) SOMASIF MTE

Synthetic swellable mica with its interlayer ions replaced with methyltrioctylammonium ions (available from Coop Chemical Co., Ltd.)

(5) Silylated Phyllosilicate A

A silylated phyllosilicate A was prepared by reacting magadiite (phyllosilicate) with dodecyltrichlorosilane (silane compound) to provide a silylated phyllosilicate, and then treating the silylated phyllosilicate with water to substitute hydroxyl groups for chloride groups remaining in silyl groups bonded to the phyllosilicate and having a dodecyl group.

Preparation of Resins

A twin screw extruder PCM-30 available from Ikegai Co., Ltd. was used for melt-kneading. The extruder had a screw diameter of 30 mm, and an average groove depth of 2.5 mm.

(Resin Composition A)

A resin composition A was prepared by mixing 100 parts by mass of PLA, 4 parts by mass of ESBEN E and 1 part by mass of a lubricant, and then melt-kneading the resulting mixture at 190° C. with a screw rotation speed of 200 rpm (=3.3 rps) with a retention time of 1.6 minutes by means of the twin screw extruder (PCM-30 available from Ikegai Co., Ltd.) having a screw diameter of 30 mm. The resin composition A had a Tg of 59° C. and a Tm of 169° C.

(Resin Composition B)

A resin composition B was prepared by mixing 100 parts by mass of PLA, 4 parts by mass of SOMASIF MEE and 1 part by mass of a lubricant, and then melt-kneading the resulting mixture in the same manner as in the preparation of the resin composition A. The resin composition B had a Tg of 56° C. and a Tm of 169° C.

(Resin Composition C)

A resin composition C was prepared by mixing 100 parts by mass of PLA, 4 parts by mass of SOMASIF MTE and 1 part by mass of a lubricant, and then melt-kneading the resulting mixture in the same manner as in the preparation of the resin composition A. The resin composition C had a Tg of 58° C. and a Tm of 169° C.

(Resin Composition D)

A resin composition D was prepared by melt-kneading 100 parts by mass of PLA and 1 part by mass of a lubricant in the same manner as in the preparation of the resin composition A. The resin composition D had a Tg of 60° C. and a Tm of 168° C.

(Resin Composition E)

A resin composition E was prepared by mixing 100 parts by mass of PLA, 4 parts by mass of the silylated phyllosilicate A and 1 part by mass of a lubricant, and then melt-kneading the resulting mixture in the same manner as in the preparation of the resin composition A. The resin composition E had a Tg of 59° C. and a Tm of 169° C.

(Resin Composition F)

A resin composition F was prepared by mixing 100 parts by mass of PLA, 10 parts by mass of SOMASIF MEE and 1 part by mass of a lubricant, and then melt-kneading the resulting mixture in the same manner as in the preparation of the resin composition A. The resin composition F had a Tg of 56° C. and a Tm of 168° C.

(Resin Composition G)

A resin composition G was prepared by mixing 100 parts by mass of PLA, 50 parts by mass of SOMASIF MEE and 1 part by mass of a lubricant, and then melt-kneading the resulting mixture in the same manner as in the preparation of the resin composition A. The resin composition G had a Tg of 57° C. and a Tm of 169° C.

Examples 1 to 10 and Comparative Examples 1 to 9

Press Sheet Forming

The resin compositions A to G thus prepared were each pressed at 190° C. for about 3 minutes by means of a desktop test press machine available from Tester Industry Co., Ltd., whereby pressed sheets were produced as formed products. The oxygen permeability coefficients of the pressed sheets thus produced (Comparative Examples 2 to 8), pressed sheets each heat-treated at 120° C. for 10 minutes (Examples 1 to 5 and Comparative Example 1) and pressed sheets each heat-treated at 120° C. for 5 minutes (Examples 6 to 10 and Comparative Example 9) were measured. The results are shown in Table 1 and FIG. 1. In FIG. 1, a region defined by a crystallinity of not lower than 15% and an oxygen permeability coefficient of not higher than 50 ml·mm/m²·day·MPa, i.e., a lower right region in FIG. 1, is a range specified by the present invention. The heat treatment temperature of 120° C. was not lower than the glass transition temperatures Tg and not higher than the melting starting temperatures Tm of all the resin compositions A to G as measured by a differential scanning calorimeter (DSC).

The formed products of Examples 1 to 10 were excellent in oxygen permeability coefficient because the phyllosilicates were contained therein, and each had a higher crystallinity because they were heat-treated.

The formed products of Comparative Examples 1 and 9 each had a higher crystallinity because they were heat-treated, but failed to have an intended barrier property with higher oxygen permeability coefficients because no phyllosilicate was contained therein.

The formed products of Comparative Examples 2, 3, 4, 6 and 7, which contained the phyllosilicates but were not heat-treated, each had a lower crystallinity and hence a higher oxygen permeability coefficient, thereby failing to have an intended barrier property.

The formed product of Comparative Example 5, which contained no phyllosilicate and was not heat-treated, had a lower crystallinity and a very high oxygen permeability coefficient.

The formed product of Comparative Example 8, which contained the phyllosilicate in a great amount, was thermally decomposed during the heat treatment. Therefore, it was impossible to produce a sheet to be evaluated.

Examples 11 to 22 and Comparative Examples 10 to 18

Blow Molding

The prepared resin compositions A to G were each melted at a cylinder temperature of 200° C., which was not lower than the melting starting temperatures Tm or the fluidization starting temperatures of the respective resin compositions A to G, by an injection blow molding machine (ASB-50TH available from Nissei ASB Machinery Co., Ltd.), and the melted resin composition was filled in a mold at 10° C. and cooled for 10 seconds. Thus, a 5-mm thick preform (bottomed parison) was prepared. The preform was heated by hot air at 120° C., and put in a cold mold or a hot mold set at a predetermined

TABLE 1

| | Form | Resin | Heat treatment | Oxygen permeability coefficient (ml · mm/m² · day · MPa) | Crystallinity (%) | Formability | Heat resistance | Evaluation |
|---|---|---|---|---|---|---|---|---|
| Example 1 | Sheet | A | 120° C., 10 min | 26 | 34 | ○ | ○ | ○ |
| Example 2 | Sheet | B | 120° C., 10 min | 33 | 35 | ○ | ○ | ○ |
| Example 3 | Sheet | C | 120° C., 10 min | 43 | 48 | ○ | ○ | ○ |
| Example 4 | Sheet | E | 120° C., 10 min | 42 | 21 | ○ | ○ | ○ |
| Example 5 | Sheet | F | 120° C., 10 min | 12 | 48 | ○ | ○ | ○ |
| Example 6 | Sheet | A | 120° C., 5 min | 47 | 21 | ○ | ○ | ○ |
| Example 7 | Sheet | B | 120° C., 5 min | 46 | 19 | ○ | ○ | ○ |
| Example 8 | Sheet | C | 120° C., 5 min | 46 | 31 | ○ | ○ | ○ |
| Example 9 | Sheet | E | 120° C., 5 min | 47 | 18 | ○ | ○ | ○ |
| Example 10 | Sheet | F | 120° C., 5 min | 16 | 27 | ○ | ○ | ○ |
| Comparative Example 1 | Sheet | D | 120° C., 10 min | 89 | 31 | ○ | x | x |
| Comparative Example 2 | Sheet | A | No | 161 | 0 | ○ | — | x |
| Comparative Example 3 | Sheet | B | No | 85 | 0 | ○ | — | x |
| Comparative Example 4 | Sheet | C | No | 138 | 0 | ○ | — | x |
| Comparative Example 5 | Sheet | D | No | 208 | 0 | ○ | — | x |
| Comparative Example 6 | Sheet | E | No | 140 | 0 | ○ | — | x |
| Comparative Example 7 | Sheet | F | No | 51 | 0 | ○ | — | x |
| Comparative Example 8 | Sheet | G | No | — | — | x | x | x |
| Comparative Example 9 | Sheet | D | 120° C., 5 min | 184 | 7 | ○ | x | x |

○: Acceptable,
x: Unacceptable,
—: Unable to evaluate temperature. Then, the preform was blown by air compressed at 3.5 MPa, whereby a bottle having a volume of 130 ml and a thickness of 1.1 mm was produced. The temperature of the cold mold was set at 25° C., and the temperature of the hot mold was set at 120° C. The temperature (120° C.) of the hot mold satisfied a mold temperature requirement of not lower than Tg+20° C. and not higher than Tm−20° C. of the respective resin compositions A to G as measured by the differential scanning calorimeter (DSC).

In Examples 11, 13, 16, 18 and 20 and Comparative Example 17, the bottles each molded in the cold mold were further heat-treated at 120° C. for 30 minutes. The heat treatment temperature (120° C.) is not lower than the glass transition temperatures Tg and not higher than the melting starting temperatures Tm of the respective resin compositions A to G as measured by the differential scanning calorimeter (DSC).

The moldability, heat resistance, steam permeability, oxygen permeability coefficient and evaluation of each of the bottles are shown in Table 2.

The molded products of Examples 11 to 22 each had an intended crystallinity, and were excellent in moldability, heat resistance and barrier property. Particularly, the molded products of Examples 12, 14, 17, 19 and 21 each had an intended crystallinity even without the post heat treatment, because the hot mold was used. The molded products of Examples 11, 13, 15, 16, 18, 20 and 22 each had an intended crystallinity and were excellent in moldability, heat resistance and barrier property, because they were subjected to the post heat treatment.

On the other hand, the molded products of Comparative Examples 11 to 16, which were each molded in the cold mold but not subjected to the post heat treatment, each had a lower crystallinity and failed to have an intended barrier property.

The molded product of Comparative Example 17, which employed the resin composition D containing no phyllosilicate, suffered from deformation due to the heat treatment and hence had an unsatisfactory heat resistance. Further, it was impossible to measure the steam permeability and the oxygen permeability coefficient.

TABLE 2

| | Form | Resin | Treatment | Crystallinity (%) | Moldability | Heat resistance | Water vapor permeability (%) | Oxygen permeability coefficient (ml · mm/m² · day · MPa) | Evaluation |
|---|---|---|---|---|---|---|---|---|---|
| Example 11 | Bottle | A | Cold mold with heat treatment | 58 | ○ | ○ | 1.72 | 35 | ○ |
| Example 12 | Bottle | A | Hot mold without heat treatment | 56 | ○ | ○ | 1.83 | 42 | ○ |
| Example 13 | Bottle | B | Cold mold with heat treatment | 66 | ○ | ○ | 1.94 | 48 | ○ |
| Example 14 | Bottle | B | Hot mold without heat treatment | 60 | ○ | ○ | 1.88 | 45 | ○ |
| Example 15 | Bottle | B | Hot mold with heat treatment | 70 | ○ | ○ | 1.36 | 23 | ○ |
| Example 16 | Bottle | C | Cold mold with heat treatment | 57 | ○ | ○ | 1.69 | 33 | ○ |
| Example 17 | Bottle | C | Hot mold without heat treatment | 56 | ○ | ○ | 1.75 | 37 | ○ |
| Example 18 | Bottle | E | Cold mold with heat treatment | 59 | ○ | ○ | 1.65 | 31 | ○ |
| Example 19 | Bottle | E | Hot mold without heat treatment | 58 | ○ | ○ | 1.88 | 45 | ○ |
| Example 20 | Bottle | F | Cold mold with heat treatment | 65 | ○ | ○ | 0.84 | 16 | ○ |
| Example 21 | Bottle | F | Hot mold without heat treatment | 57 | ○ | ○ | 1.01 | 18 | ○ |
| Example 22 | Bottle | F | Hot mold with heat treatment | 71 | ○ | ○ | 0.81 | 12 | ○ |
| Comparative Example 10 | Bottle | A | Cold mold without heat treatment | 11 | ○ | — | 3.54 | 155 | x |
| Comparative Example 11 | Bottle | B | Cold mold without heat treatment | 12 | ○ | — | 2.32 | 81 | x |
| Comparative Example 12 | Bottle | C | Cold mold without heat treatment | 12 | ○ | — | 3.15 | 131 | x |
| Comparative Example 13 | Bottle | E | Cold mold without heat treatment | 9 | ○ | — | 3.87 | 175 | x |
| Comparative Example 14 | Bottle | F | Cold mold without heat treatment | 12 | ○ | — | 2.20 | 51 | x |
| Comparative Example 15 | Bottle | G | Cold mold without heat treatment | — | x | — | — | — | x |
| Comparative Example 16 | Bottle | D | Cold mold without heat treatment | 2 | ○ | — | 4.29 | 200 | x |
| Comparative Example 17 | Bottle | D | Cold mold with heat treatment | 59 | ○ | x | — | — | x |
| Comparative Example 18 | Bottle | D | Hot mold without heat treatment | — | x | x | — | — | x |

○: Acceptable,
x: Unacceptable,
—: Unable to evaluate
Cold mold: Mold temperature for blow molding was set at 25° C.
Hot mold: Mold temperature for blow molding was set at 120° C.
Heat treatment: In hot air dryer at 120° C. for 30 minutes.

In Comparative Example 18, the resin composition D containing no phyllosilicate was used. Therefore, it was impossible to provide a molded product, because the resin composition D was not solidified in the hot mold. Hence, it was impossible to measure the crystallinity, the steam permeability and the oxygen permeability coefficient.

The invention claimed is:

1. A biodegradable gas barrier container comprising 100 parts by mass of a biodegradable polyester resin having a polylactic acid content of not less than 50% by mass, and 0.1 to 10 parts by mass of a phyllosilicate having layers, wherein a substituted silyl group having a substituted or unsubstituted alkyl group is bonded between the layers thereof, and said biodegradable gas barrier container is a container which is heat-treated at a temperature not lower than a glass transition temperature and not higher than a melting starting temperature of the resin as measured by a differential scanning calorimeter (DSC) during the molding, the biodegradable gas barrier container having a crystallinity of not lower than 15% as measured by X-ray diffractometry, and an oxygen permeability coefficient of not higher than 50 ml·mm/m$^2$·day·MPa as measured at 20° C. at a relative humidity of 90%.

2. A biodegradable gas barrier container as set forth in claim 1, wherein the phyllosilicate is a phyllosilicate comprising at least one ion selected from the group consisting of a primary ammonium ion, a secondary ammonium ion, a tertiary ammonium ion, a quaternary ammonium ion, a pyridinium ion, an imidazolium ion or a phosphonium ion ion-bonded between layers thereof.

3. A biodegradable gas barrier container as set forth in claim 1, which is a container for a fluid.

4. A biodegradable gas barrier container as set forth in claim 2, which is a container for a fluid.

5. A production method for a biodegradable gas barrier container as recited in claim 1, comprising the steps of:
   molding a product from a biodegradable resin composition comprising 100 parts by mass of a biodegradable polyester resin having a polylactic acid content of not less than 50% by mass, and 0.1 to 10 parts by mass of a phyllosilicate having layers, wherein a substituted silyl group having a substituted or unsubstituted alkyl group is bonded between the layers thereof; and
   heat-treating the product at a temperature not lower than a glass transition temperature and not higher than a melting starting temperature of the resin as measured by a differential scanning calorimeter (DSC) during the molding.

6. A production method for a biodegradable gas barrier container as recited in claim 2, comprising the steps of:
   molding a product from a biodegradable resin composition comprising 100 parts by mass of a biodegradable polyester resin having a polylactic acid content of not less than 50% by mass, and 0.1 to 10 parts by mass of a phyllosilicate having layers, wherein a substituted silyl group having a substituted or unsubstituted alkyl group is bonded between the layers thereof; and
   heat-treating the product at a temperature not lower than a glass transition temperature and not higher than a melting starting temperature of the resin as measured by a differential scanning calorimeter (DSC) during the molding.

7. A production method for a biodegradable gas barrier container as recited in claim 3, comprising the steps of:
   molding a product from a biodegradable resin composition comprising 100 parts by mass of a biodegradable polyester resin having a polylactic acid content of not less than 50% by mass, and 0.1 to 10 parts by mass of a phyllosilicate having layers, wherein a substituted silyl group having a substituted or unsubstituted alkyl group is bonded between the layers thereof; and
   heat-treating the product at a temperature not lower than a glass transition temperature and not higher than a melting starting temperature of the resin as measured by a differential scanning calorimeter (DSC) during the molding.

8. A production method for a biodegradable gas barrier container as recited in claim 4, comprising the steps of:
   molding a product from a biodegradable resin composition comprising 100 parts by mass of a biodegradable polyester resin having a polylactic acid content of not less than 50% by mass, and 0.1 to 10 parts by mass of a phyllosilicate having layers, wherein a substituted silyl group having a substituted or unsubstituted alkyl group is bonded between the layers thereof; and
   heat-treating the product at a temperature not lower than a glass transition temperature and not higher than a melting starting temperature of the resin as measured by a differential scanning calorimeter (DSC) during the molding.

* * * * *